3,542,704
Patented Nov. 24, 1970

3,542,704
POLYURETHANE COMPOSITIONS INCLUDING AROMATIC SULFONES

Milton R. Radcliffe, Marblehead, and Paul J. Tillman, Peabody, Mass., assignors to USM Corporation, Flemington, N.J., a corporation of New Jersey
No Drawing. Continuation-in-part of application Ser. No. 611,829, Jan. 26, 1967. This application July 7, 1969, Ser. No. 839,707
Int. Cl. C08g 22/04, 41/00, 51/46
U.S. Cl. 260—2.5
8 Claims

ABSTRACT OF THE DISCLOSURE

The specification discloses polyurethane compositions including therein aromatic sulfones. The compositions may be either cellular or noncellular products. The sulfones act as flexibilizing plasticizers for the noncellular products and improve the compressive strength of the cellular products.

---

The present application is a continuation-in-part of U.S. Ser. No. 611,829, filed Jan. 26, 1967, in the names of Milton R. Radcliffe and Paul J. Tillman, now abandoned.

The present invention relates to polyurethane compositions which include aromatic sulfones as modifiers.

Generally, the addition of a modifier, which is nonreactive with the isocyanate component of a polyurethane, has an adverse effect on various physical properties of the polyurethane. Many times the properties so affected are those which are most desirable or critical to performance under anticipated conditions or usages.

It is an object of this invention to provide a modified polyurethane.

It is a further object of this invention to provide a modified polyurethane having physical properties which are not adversely affected to any significant extent despite the modifier being a material which is nonreactive with the isocyanate component of the polyurethane.

These and other objects of the invention are obtained in a modified polyurethane composition including as a modifier an aromatic sulfone and more specifically a diaryl sulfone having the formula

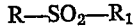

$$R-SO_2-R_1$$

where R is an aryl radical which is a benzene derivative and $R_1$ is an aryl radical which is a benzene, biphenyl or naphthalene derivative.

Examples of the diaryl sulfones which may be used as modifiers for polyurethane, within practice of this invention, include diphenyl sulfone, phenyl tolyl sulfone, ditolyl sulfone, xylyl tolyl sulfone, dixylyl sulfone, tolyl paracymyl sulfone, phenyl chlorophenyl sulfone, phenyl anisyl sulfone, etc., also phenyl biphenyl sulfone, tolyl biphenyl sulfone, xylyl biphenyl sulfone, etc., and, phenyl naphthyl sulfone, tolyl naphthyl sulfone, xylyl naphthyl sulfone, etc. In any given situation a specific diaryl sulfone or mixture of the indicated specific diaryl sulfones may be preferred. This will depend upon the particular polyurethane to be modified as well as processing and end use considerations. In this regard, and particularly in the area of processing considerations it bears noting that some of the diaryl sulfones are liquids while others are solids.

The amount of the diaryl sulfone which may be used to advantage as a modifier for polyurethane generally ranges about 5 to about 50 weight percent based on total weight of polyurethane composition. A more preferred range is about 10 to 30 weight percent based on total weight of composition. Within the indicated ranges there will be some variation to arrive at the optimum amount for any given formulation. This will depend on the particular polyurethane and the particular diaryl sulfone used as well as processing and end use considerations.

The diaryl sulfone may be introduced into the polyurethane composition in any convenient manner as by use of a mixer, blender, plasticator, colloider, mill, etc. Introduction of the diaryl sulfone is carried out while the urethane is in processable and preferably fluid or liquid form. In most instances this will be prior to reaction, either chain extension or cross-linking designed to convert the urethane into solidified state. In other instances the diaryl sulfone may be added where reaction has been partially or totally carried out. In the latter instance the polyurethane may be a solid. Instances of this latter include, for example, where the polyurethane is of the thermoplastic type and capable of being worked.

Polyurethanes are synthetic organic polymeric systems of the type obtained from the reaction between isocyanate containing compositions or compounds and hydroxyl or amine containing compounds. Polyurethanes are most commonly linked through urethane linkages. Other linkages which may also be present in polyurethanes are urea, allophanate and biuret linkages. The isocyanate containing compound used in producing polyurethanes is usually a diisocyanate such as toluene diisocyanate (TDI) diphenylmethane 4,4'-diisocyanate (MDI) or polymethylene polyphenyl isocyanate (PAPI). The hydroxyl group containing compound then may be a polyol such as polyether, polyester as well as various oils such as castor oils, etc.

Considered relative to their production, a common way of describing polyurethanes is in terms of their being one part or two part systems. One part systems are actually isocyanate terminated low molecular weight intermediates which polymerize by self reaction or with moisture. The one part systems are usually provided for processing as viscous fluids which harden by reaction with moisture or themselves in the presence of heat and catalysts to yield a plastic or rubbery, essentially solid material. Two part systems then are those obtained from reacting a first part which is a hydroxyl or amine bearing prepolymer such as a polyether or polyester, polyamine, polyamide or polyurea, or mixture, with a second part which is an isocyanate bearing compound or adduct. The products obtained from either processing system have essentially the same properties.

Another way of describing polyurethanes relative to their processing or production is in terms of their being a one shot or two shot system. What is referred to by this can be most simply described in relation to the isocyanate. If the isocyanate is introduced to the final reaction in previously unreacted condition, the process is referred to as a one shot process. If on the other hand the isocyanate is partially reacted first to produce, for example, an intermediate or prepolymer having retained or residual isocyanate reactivity, and this then is caused to react again through that reactivity, this is what is commonly referred to as a two shot prepolymerization.

Again, polyurethanes are commonly defined or catalogued into general groups with respect to their desired end use properties. This will determine their chemical identities and many times the methods used in processing and reacting them through to a solidified state. Similarly, the effect of diaryl sulfones on the properties of the various groups of polyurethanes as well as the methods used for introducing the diaryl sulfones to the polyurethanes of the various groups may be determined and described.

The general groups of polyurethanes may be described as rigid foams, flexible foams and elastomers. The latter group, elastomers, at least for present purposes is taken to include coatings, films, adhesives and moldings, etc.

As indicated, the first two groups of polyurethanes are foams, the first group rigid foams and the second group the flexible foams. For present purposes, the term rigid foam is intended to include intermediate foams, or those which are commonly referred to as semi-rigid foams. Foams are produced by the reaction (exothermic) of a polyisocyanate and a polyol in the presence of a catalyst and a foaming or blowing agent. The blowing agent may be carbon dioxide, formed by reaction of excess isocyanate groups and water, or it may be provided through addition of a blowing agent such as a fluorocarbon. Whether a foam is to be flexible or rigid is determined by cross-link density and equivalent weight. Rigid foams are in general more highly cross-linked and of relatively lower equivalent weight than flexible foams. The choice of reactants determines this. Rigid foams are produced from relatively low molecular weight, higher functional polyols, while flexible foams are produced from polyols having moderately high molecular weight and lower functionality. The foams may be produced from polyols including castor oil, glycols, polyesters, polyamides and more generally polyethers. Referring back to the functionality considerations differentiating rigid and flexible foams, and using the polyether based polyurethanes as an example, polyethers used in producing rigid foams generally have hydroxyl numbers in the range of 350 to 600, polyethers used in producing flexible foams have hydroxyl numbers in the range 40 to 70, and the polyethers used in producing the intermediate foams referred to previously are between those ranges.

Properties of rigid polyurethane foams are determined to a large extent by the type and amount of chemical constituents going into their production, but also in the processing used for their production. Compressive strength, also described as toughness, is increased or improved by the introduction of the diaryl sulfones to the rigid polyurethane foams in the amounts previously indicated. Rigid polyurethanes are generally produced by a one-shot process, and the diaryl sulfone may be conveniently introduced to the starting materials or batches.

Again with respect to flexible foams, their properties too are determined to a large extent by their chemical identity as well as their manner of processing. In the case of flexible foams, flexibility is a critical property and it may be increased or improved by the introduction of diaryl sulfone in the indicated amounts. Flexible foams may be produced by either a one-shot or a two-shot process. The diaryl sulfone may be introduced quite easily into the starting materials used in either process. However, it is preferred that the diaryl sulfone be added to the resin side, that is, the hydroxyl terminated polymer batch or starting material.

Polyurethane elastomers are as the term indicates polyurethanes having elastomeric characteristics. The polyurethane elastomers are generally two-shot reaction systems. They may be utilized either as reactive or prereacted systems. Either may be in solvated form when prepared for use, that is, use as molding, casting, coating, saturating compositions, adhesives, etc. The diaryl sulfone may be introduced to those compositions at any point prior to final utilization. Flexibility of the polyurethane elastomers is an important or critical property. The introduction of the diaryl sulfone to the elastomer polyurethanes in the indicated amounts serves to improve their flexibility. To state it again, the diaryl sulfones act as flexibilizing plasticizers for polyurethane elastomers.

The following examples are provided for the purpose of further illustrating the invention.

EXAMPLE I

Polyurethane elastomer

One hundred parts by weight of propylene oxide adduct of propylene glycol, having a molecular weight of 2000 and a hydroxyl number of 56 are reacted with 17.5 parts by weight of toluene diisocyanate in a closed reaction vessel for a period of 12 hours. The isocyanate terminated prepolymer obtained as a result is a viscous but pourable liquid having a free isocyanate content of about 2.5 percent by weight. The prepolymer is then mixed with 85 percent of equivalent amount of 4,4′ methylene bis 2 chloroaniline and the mixture directed into a mold. Curing is carried out in the mold for 3 hours at 80° C. followed by post curing at 120° C. for 2 hours.

Elastomers are also prepared in which various amounts of diaryl sulfone are added to the formulation described above. The additions are made by mixing the diaryl sulfone into the prepolymer together with the curing agent. Curing and post curing are then carried out in the indicated manner.

Samples are taken from the various cast elastomer produced above and tested in the manner and with results to be indicated.

| Identity and amt. of diaryl sulfone present, percent by weight | Elongation and ASTM D-412 | Tensile strength p.s.i., ASTM | Modulus 300%, ASTM D-412 | Graves tear strength, die C | Shore A hardness |
|---|---|---|---|---|---|
| None | 700 | 2,150 | 800 | 145 | 63 |
| Tolyl phenyl sulfone-10 | 750 | 2,100 | 780 | 160 | 63 |
| Tolyl phenyl sulfone-25 | 800 | 2,000 | 760 | 185 | 64 |
| Tolyl phenyl sulfone-50 | 760 | 1,800 | 700 | 175 | 64 |
| Xylyl naphthyl sulfone-10 | 780 | 2,150 | 780 | 170 | 62 |
| Xylyl naphthyl sulfone-25 | 840 | 2,100 | 750 | 200 | 61 |
| Xylyl naphthyl sulfone-50 | 820 | 1,950 | 670 | 180 | 60 |
| Xylyl biphenyl sulfone-10 | 740 | 2,100 | 800 | 160 | 63 |
| Xylyl biphenyl sulfone-25 | 820 | 2,000 | 770 | 175 | 62 |
| Xylyl biphenyl sulfone-50 | 790 | 1,900 | 710 | 170 | 62 |

The elongation results obtained above indicate improvement in flexibility of the polyurethane elastomer compositions. In addition to that the results show that other important physical properties of the elastomers modified by the addition of the diaryl sulfones in the amounts indicated are not adversely affected to any significant amount. Rather in some cases, specifically the modulus and tear strength results showed improvement in those properties as well.

EXAMPLE II

Rigid polyurethane foam

A polyol component charge is prepared based on the following formulation.

Material: Amount (parts by weight)
Triol (propylene oxide adduct of glycerol) molecular weight 380 and hydroxyl number 440) _____ 100.0
Surfactant (silicone fluid) _____ 1.0
Catalyst (tetramethyl butane diamine) _____ 0.1
Catalyst (dibutyl tin dilaurate) _____ 0.5
Blowing agent (trichloro monofluoromethane)_ 40.0

The charge is directed into a cardboard container and mixing is carried out under low speed until homogenity is achieved. Thereafter 103.0 parts by weight of polymethylene polyphenyl isocyanate is added with rapid, high speed mixing to the charge, over a period of 15 seconds. The reaction mixture then obtained is passed directly into a vacuum formed polyethylene mold and is allowed to cure under atmospheric pressure and room temperature conditions. The rigid foam obtained has a density of about 2 lbs. per cubic foot.

A number of rigid foams are also prepared in which the formulation set forth above is varied through addition of various amounts of diaryl sulfones. Addition of the diaryl sulfone is to the polyol component charge. Otherwise, the procedure set forth above is followed in providing the rigid foam products.

Samples are taken from the various rigid foams produced above and testing with the results to be indicated below are obtained.

TABLE 2

| Identity and amount of diaryl sulfone added, percent by weight: | Compressive strength lbs. per sq. inch ASTM 1621-59 |
|---|---|
| None | 22.0 |
| Tolyl phenyl sulfone 10 | 23.5 |
| Tolyl phenyl sulfone 25 | 26.0 |
| Tolyl phenyl sulfone 50 | 30.0 |
| Xylyl naphthyl sulfone 10 | 25.0 |
| Xylyl naphthyl sulfone 25 | 28.5 |
| Xylyl naphthyl sulfone 50 | 33.0 |
| Xylyl biphenyl sulfone 10 | 24.5 |
| Xylyl biphenyl sulfone 25 | 29.0 |
| Xylyl biphenyl sulfone 50 | 30.0 |

As indicated by the results in the table above the compression strength of those rigid foams modified by inclusion of the diaryl sulfone in the indicated amounts show improvement. In addition, when tested, the various foams do not show any significant loss in the following properties due to the inclusion or addition of the diaryl sulfone: friability, flammability, heat distortion, dimensional stability and moisture sensitivity.

EXAMPLE III

Flexible polyurethane foam

A polyol component charge is prepared based on the following formulation.

| Material: | Amount (parts by weight) |
|---|---|
| Tiol (propylene oxide adduct of glycerol; molecular weight 3000 and hydroxyl number of 56) | 50.00 |
| Surfactant (silicone fluid) | 0.63 |
| Catalyst (tetramethyl butane diamine) | 0.13 |
| Water | 1.13 |

The charge is directed into a cardboard container and mixing with a high speed mixer is started. After homogeneity is achieved, and 16.20 parts by weight of toluene diisocyanate (80-20 isomer mixture) are added. The mix is immediately directed into a vacuum formed polyethylene mold. Foaming is allowed to take place at atmospheric pressure and temperature conditions. The flexible foam obtained as a result has a density of 3.0 lbs. per cubic foot.

A number of flexible foams are also prepared in which variations are effected in the formulations set forth above. The basic variation is addition of diaryl sulfone. In addition in those instances additions, proportional to the weight additions of diaryl sulfone are made to the surfactant and catalyst. The procedure set forth above is otherwise followed in the preparation of the flexible foams.

Samples are taken from the various flexible foams produced above and testing with the results to be indicated in Table 3 are obtained.

TABLE 3

| Identity and amount of diaryl sulfone present percent by weight | Compression deflection 25% | Compression deflection 65% | Compression set 50%, 22 hr. 70° C., percent |
|---|---|---|---|
| None | .50 | .60 | 4.2 |
| Tolyl phenyl sulfone 10 | .55 | .60 | 4.1 |
| Tolyl phenyl sulfone 25 | .70 | 1.0 | 4.0 |
| Tolyl phenyl sulfone 50 | .80 | 1.4 | 3.8 |
| Xylyl naphthyl sulfone 10 | .45 | .55 | 4.3 |
| Xylyl naphthyl sulfone 25 | .50 | .70 | 4.4 |
| Xylyl naphthyl sulfone 50 | .65 | .90 | 4.8 |
| Xylyl biphenyl sulfone 10 | .60 | .80 | 4.2 |
| Xylyl biphenyl sulfone 25 | .80 | 1.10 | 4.0 |
| Xylyl biphenyl sulfone 50 | .90 | 1.40 | 3.9 |

The compression deflection test is a standard specification test of the Rubber Mfrs. Association and expresses the load in p.s.i. required to produce a deflection of 25% and 65% by an indentor part 50 square inches in size.

Compression set is the measure of loss in original height of a flexible foam sample after being held under constant deflection of 50% for 22 hours at 70° C.

The preceding results indicate that the inclusion of the diaryl sulfones provide a urethane foam with more linear load-deflection characteristics which desirably resembles rubber latex foams. It is also evident that the solid sulfones provide more desirable performance in this respect than the liquid ones. This may also be stated as indicating that the polyurethane flexible foams modified by the inclusion of diaryl sulfone in the indicated amounts show improved flexibility.

Other important physical properties of flexible foams include tensile strength, elongation and tear resistance. Tensile strength does not appear to be appreciably affected by the inclusion or modification by the diaryl sulfone whereas elongation appears to be somewhat lessened, but not to a significant extent. Tear strength, however, is increased by lower amounts of the diaryl sulfones, specifically within the previously indicated preferred range of 10-30 weight percent of total.

Physical properties of lesser importance in flexible foams, such as flammability, odor, moisture absorption and foaming characteristics do not appear to be more than minimally affected by the inclusion of the diaryl sulfone in the indicated amounts.

It will thus be seen that the objects set forth above, among those made apparent from the preceding description, are efficiently attained and, since certain changes may be made in carrying out the method and in the modified polyurethane compositions set forth without departing from the scope of the invention, it is intended that all matter contained in the above description shall be interpreted as illustrative and not in a limiting sense.

Having thus described our invention what we claim as new and desire to secure by Letters Patent of the United States is:

1. A modified polyurethane composition comprising a polyurethane and based on the total weight of the composition 5 to 50 percent of an aromatic sulfone having the formula:

$$R-SO_2-R_1$$

where R is selected from the group consisting of phenyl, tolyl and xylyl and $R_1$ is selected from the group consisting of phenyl, tolyl, xylyl, cymyl, chlorophenyl, anisyl, biphenyl and naphthyl.

2. A composition according to claim 1 wherein the amount of aromatic sulfone is about 10 to 30 weight percent of the composition.

3. A composition according to claim 1 wherein the aromatic sulfone is tolyl phenyl sulfone.

4. A composition according to claim 1 wherein the aromatic sulfone is xylyl naphthyl sulfone.

5. A composition according to claim 1 wherein the aromatic sulfone is xylyl biphenyl sulfone.

6. A composition according to claim 1 wherein the polyurethane composition is a flexible foam.

7. A composition according to claim 1 wherein the polyurethane composition is a rigid foam.

8. A composition according to claim 1 wherein the polyurethane composition is a solid elastomer.

References Cited

UNITED STATES PATENTS

| | | | |
|---|---|---|---|
| 2,741,800 | 4/1956 | Brockway | 260—2.5 |
| 2,953,533 | 9/1960 | Khawam | 260—2.5 |
| 2,998,453 | 8/1961 | Nichols | 260—607 |
| 2,998,454 | 8/1961 | Nichols | 260—607 |
| 3,102,825 | 9/1963 | Rogers et al. | 117—98 |
| 3,249,573 | 5/1966 | Rollmann | 260—30.8 |

DONALD E. CZAJA, Primary Examiner

F. McKELVEY, Assistant Examiner

U.S. Cl. X.R.

260—30.8, 607